United States Patent
Taaghol et al.

(10) Patent No.: US 8,233,912 B2
(45) Date of Patent: Jul. 31, 2012

(54) MOBILE STATION LOCALIZATION APPARATUS, SYSTEMS, AND METHODS

(75) Inventors: Pouya Taaghol, San Jose, CA (US); Muthaiah Venkatachalam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/651,566

(22) Filed: Jan. 4, 2010

(65) Prior Publication Data

US 2010/0103825 A1  Apr. 29, 2010

Related U.S. Application Data

(63) Continuation of application No. 11/613,905, filed on Dec. 20, 2006, now Pat. No. 7,787,891.

(51) Int. Cl.
*H04W 24/00* (2009.01)

(52) U.S. Cl. ............... 455/456.1; 455/456.6; 455/561; 370/328; 342/386; 342/450; 342/463

(58) Field of Classification Search ....... 455/456.1–457, 455/67.11, 404.2, 561; 370/338, 328; 342/450, 342/463, 464, 385, 386
See application file for complete search history.

(56) References Cited

U.S. PATENT DOCUMENTS

| 5,208,756 | A | 5/1993 | Song |
| 6,029,070 | A | 2/2000 | Kingdon et al. |
| 6,226,271 | B1 | 5/2001 | Dent |
| 6,266,534 | B1 | 7/2001 | Raith et al. |
| 7,123,924 | B2 | 10/2006 | Cuffaro |
| 7,787,891 | B2 | 8/2010 | Taaghol et al. |
| 2004/0162084 | A1* | 8/2004 | Wang .................. 455/456.1 |
| 2005/0130680 | A1 | 6/2005 | Northcutt |
| 2005/0195109 | A1 | 9/2005 | Davi et al. |
| 2005/0197136 | A1* | 9/2005 | Friday et al. ......... 455/456.1 |
| 2006/0111121 | A1 | 5/2006 | Ishikawa et al. |
| 2007/0049295 | A1* | 3/2007 | Soliman et al. ....... 455/456.3 |
| 2008/0153507 | A1 | 6/2008 | Taaghol et al. |
| 2008/0280624 | A1* | 11/2008 | Wrappe ............... 455/456.1 |
| 2010/0093374 | A1* | 4/2010 | Dacosta .............. 455/456.3 |

FOREIGN PATENT DOCUMENTS

| WO | WO-2004012375 A2 | 2/2004 |
| WO | WO-2008079626 A1 | 7/2008 |

OTHER PUBLICATIONS

"U.S. Appl. No. 11/613,905, Non Final Office Action Mailed Aug. 13, 2009", 24 pgs.

(Continued)

*Primary Examiner* — Marcos Torres
(74) *Attorney, Agent, or Firm* — Schwegman, Lundberg & Woessner, P.A.

(57) ABSTRACT

Embodiments herein may use first and second path loss values L1 and L2 to calculate first and second distances R1 and R2 between the MS and first and second base stations BS1 and BS2, respectively, in a wireless packet-carrying network. L1 and L2 may comprise values of a reduction in signal strength of signals as transmitted by the BS1 and the BS2 and as received by the MS. The MS may triangulate its position relative to a grid using R1 and R2. Other embodiments may be described and claimed.

7 Claims, 4 Drawing Sheets

OTHER PUBLICATIONS

"U.S. Appl. No. 11/613,905, Response filed Dec. 7, 2009 to Non Final Office Action mailed Aug. 13, 2009", 9 pgs.

"International Application Serial No. PCT/US2007/086680, Written Opinion mailed May 13, 2008", 6 pgs.

"International Application Serial No. PCT/US2007/086680, International Search Report mailed May 13, 2008", 14 pgs.

Backman, W., "Signal level interpolation for coverage area prediction", *Vehicular Technology Conference, 2004, VTC2004-Fall. 2004IEEE, 60th Conference*, vol. 1, (Sep. 26-29), 67-71 pgs.

Orooji, M., et al., "New Method for Estimation of Mobile Locations Based on Signal Attenuation and Hata Model Signal Prediction", *Engineering in Medicine and Biology Society, 27th Annual International Conference, Proceedings of the 2005 IEEE*, (Sep. 1-4, 2005), 6025-6028 pgs.

Venkatachalam, Muthuaiah, "Methods and Apparatus for Location Based Services in Wireless Networks", U.S. Appl. No. 11/475,294, filed Jun. 26, 2006.

"U.S. Appl. No. 11/613,905, Final Office Action mailed Mar. 2, 2010", 23 pgs.

"U.S. Appl. No. 11/613,905, Notice of Allowance mailed Apr. 30, 2010", 6 pgs.

"Chinese Application Serial No. 200780046838.2, Office Action mailed Sep. 15, 2011", 4 pgs.

* cited by examiner

MOBILE STATION LOCALIZATION APPARATUS, SYSTEMS, AND METHODS

This application is a continuation of U.S. patent application Ser. No. 11/613,905, filed on Dec. 20, 2006, now issued as U.S. Pat. No. 7,787,891, which is incorporated herein by reference in its entirety.

TECHNICAL FIELD

Various embodiments described herein relate to apparatus, systems, and methods associated with wireless communication, including mobile station localization techniques.

BACKGROUND INFORMATION

Location positioning of a mobile station (MS) may be useful for emergency situation management, surveillance, value-added services, and location-smart applications.

Several network-based MS positioning methods have been proposed. Some triangulation systems may utilize multiple base stations (BSs) in communication with the MS. The system may measure a differential delay between a transmission from the MS and a receipt of the transmission at each of two or more BSs. This technique may assume that the multiple base stations are listening to the signal transmitted by the MS. That is, receive diversity may be required. Thus, the MS must actively participate in the location positioning procedure.

Another widely-used technique utilizes the global positioning system (GPS). This technique requires GPS hardware in the MS, thus adding to the cost and complexity of the device. Furthermore, GPS requires a direct-line-of-sight path between the mobile device and the GPS satellites, and thus restricts the GPS technique largely to an outdoor environment.

Therefore, a need exists in the art for an MS localization system that requires neither macro diversity nor active transmission by the MS for localization operations.

DETAILED DESCRIPTION

Figure 1:
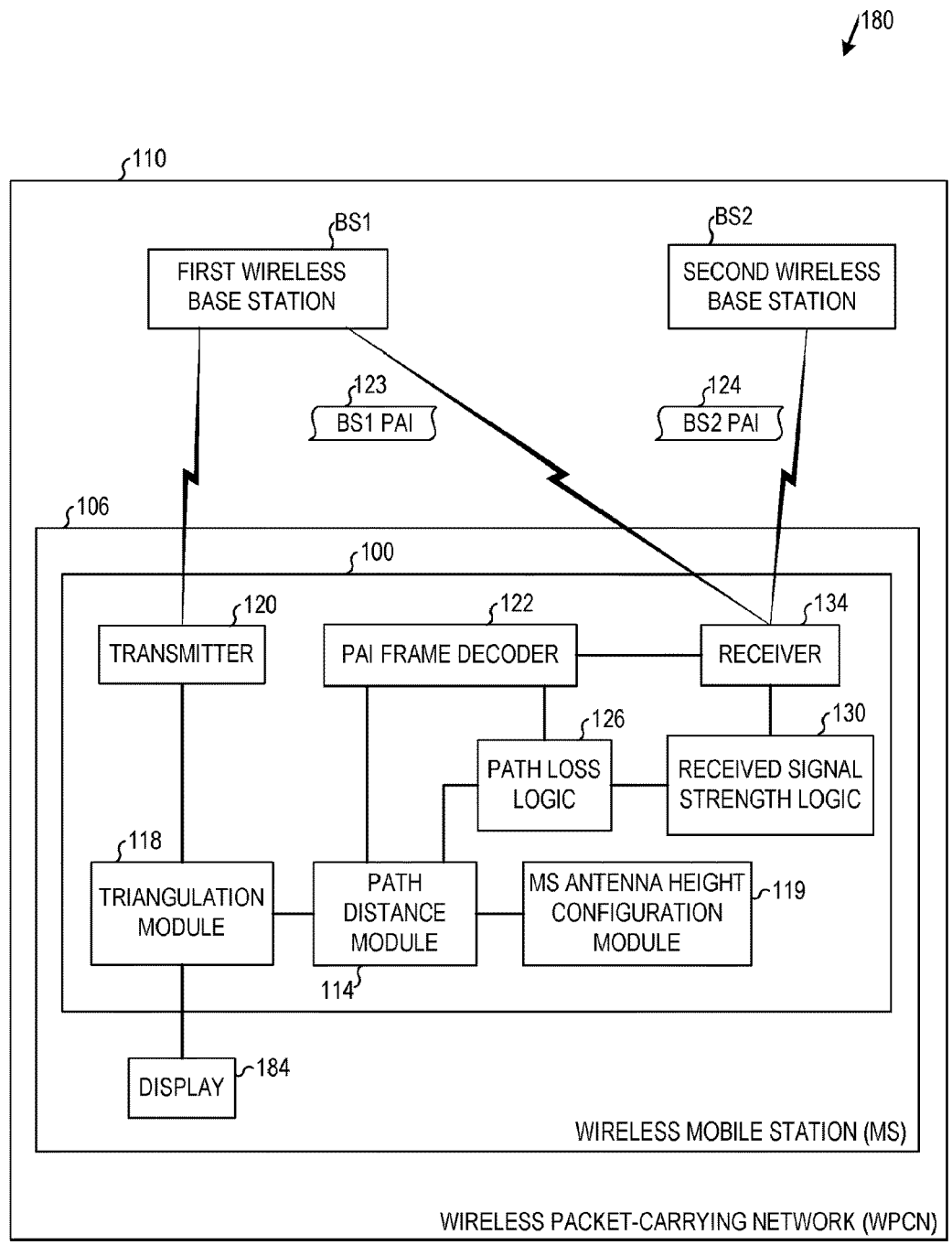
FIG. 1 is a block diagram of an apparatus and a system according to various embodiments.

FIG. 1 is a block diagram of an apparatus 100 and a system 180 according to various embodiments. The apparatus 100 and the system 180 may be useful for localization of an MS 106 in a wireless packet-carrying network (WPCN) 110. The apparatus 100 may include a path distance module 114 associated with the MS 106.

Figure 2:
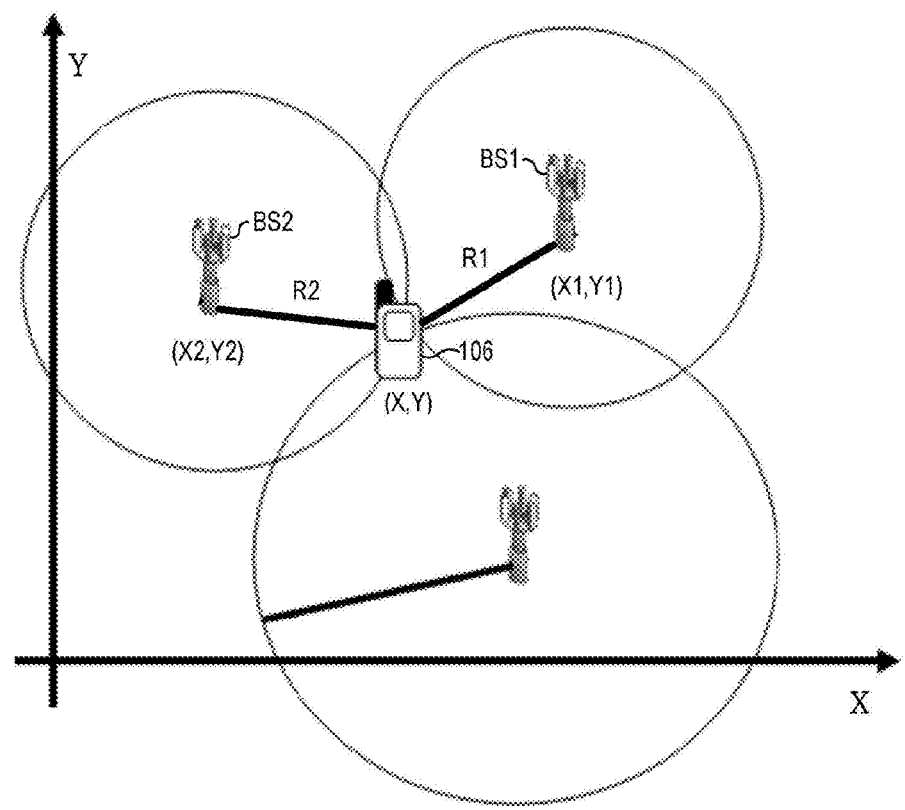
FIG. 2 is a positional diagram of typical stations in a wireless packet-carrying network according to various embodiments.

FIG. 2 is a positional diagram of typical stations in a wireless packet-carrying network according to various embodiments. The path distance module 114 (FIG. 1) may calculate a first distance R1 between the MS 106 and a first base station BS1 and a second distance R2 between the MS 106 and a second base station BS2.

Path loss values L1 and L2 (neither shown) may be used in the calculation of R1 and R2, respectively. L1 may comprise a value of a reduction in signal strength of a signal as transmitted by the BS1 and as received by the MS 106. Likewise, L2 may comprise a value of a reduction in signal strength of a signal as transmitted by the BS2 and as received by the MS 106. Apparatus and methods associated with the derivation of L1 and L2 and with the relationship between L1 and L2, R1 and R2, and a position of the MS (X,Y) on a grid X and Y are described in detail hereinunder.

In an embodiment, a COST231-Hata path loss model may be used to relate path loss to transmitted carrier frequency, an antenna height of the MS 106, an antenna height of the BS1 or the BS2, metropolitan area size, and a distance between the MS 106 and the BS1 or between the MS 106 and the BS2. Additional information regarding the COST231-Hata path loss model may be found in M. Hata, "Empirical Formula for Propagation Loss in Land Mobile Radio Services," *IEEE Transaction on Vehicular Technology*, vol. VT-29, pgs. 317-325 (September 1981). Embodiments herein are not limited to any particular path loss model.

Turning back to FIG. 1 and referring to FIG. 2 as necessary, a triangulation module 118 may be coupled to the path distance module 114. Using R1 and R2, the triangulation module 118 may triangulate a position of the MS 106 relative to the grid X and Y. A transmitter 120 may be coupled to the triangulation module 118. In an embodiment, the transmitter 120 may transmit the position of the MS 106 relative to the grid X and Y to another network entity.

The apparatus 100 may also include an MS antenna height configuration module 119 coupled to the path distance module 114. The MS antenna height configuration module 119 may present a value of an antenna height of the MS 106 to the path distance module 114. The value of the antenna height may correspond to a height above a ground level of the MS 106. The ground level may be referenced to sea level or to some other reference level. The value of the antenna height may be used in calculating L1 and L2. In some embodiments, the MS antenna height configuration module 119 may be configured to store a static value of the antenna height of the MS 106.

The apparatus 100 may also include a position assistant information (PAI) frame decoder 122 coupled to the path distance module 114. The PAI frame decoder 122 may extract path loss parameter values from a frame 123 transmitted from the BS1 and from a frame 124 transmitted from the BS2. The frames 123 and 124 may comprise broadcast frames in some embodiments. The frames 123 and 124 may be received at the MS 106 from the BS1 and from the BS2, respectively. The PAI frame decoder 122 may pass the path loss parameter values to the path distance module 114.

Figure 3:
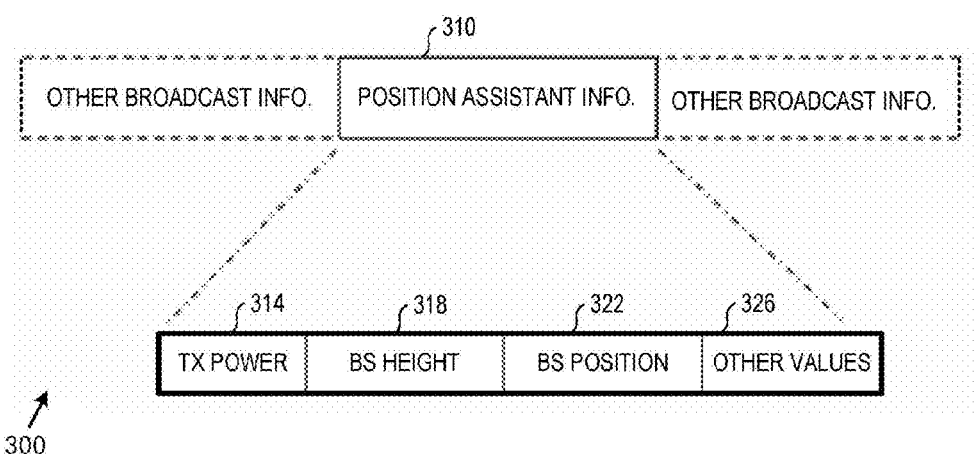
FIG. 3 is frame diagram according to various embodiments.

FIG. 3 is a frame diagram 300 according to various embodiments. In some embodiments, the frames 123 and 124 (FIG. 1) may be configured as detailed in the frame diagram 300. The path loss parameter values may be embedded in PAI fields 310. First path loss parameter values associated with the BS1 may comprise one or more of a value of transmit power P1 at the BS1 (e.g., the transmit power value 314 of FIG. 3), an antenna height associated with the BS1 (e.g., the BS height 318), or a position (X1,Y1) of the BS1 relative to the grid X and Y (e.g., the BS position 322). Likewise, second path loss parameter values associated with the BS2 may comprise one or more of a value of transmit power P2 (not shown) at the BS2, an antenna height associated with the BS2, or a position (X2,Y2) of the BS2 relative to the grid X and Y. The BS height 318 may be referenced to the ground level, to sea level, or to some other reference level. Additional path loss parameter values 326 may be included in the frames 123 and 124 as applicable to various path loss models that may be utilized by various embodiments.

Turning back to FIG. 1, the apparatus 100 may further include path loss logic 126 coupled to the PAI frame decoder 122. The path loss logic 126 may calculate L1 as a difference between the value of transmit power P1 and a signal strength S1 of the signal as received at the MS from the BS1. The path loss logic 126 may also calculate L2 as a difference between the value of transmit power P2 and a signal strength S2 of the signal as received at the MS from the BS2. Received signal strength logic 130 may be coupled to the path loss logic 126 to determine S1 and S2.

The apparatus 100 may also include a receiver 134 coupled to the PAI frame decoder 122. The receiver 134 may receive the frames 123 and 124 containing the first and second path loss parameter values, respectively.

In a further embodiment, a system 180 may include one or more of the apparatus 100. The system 180 may also include a display 184 coupled to the triangulation module 118. The display 184 may display the position of the MS 106 relative to the grid X and Y. The display 184 may comprise a cathode ray tube display or a solid-state display such as a liquid crystal display, a plasma display, or a light-emitting diode display, among others.

Any of the components previously described may be implemented in a number of ways, including embodiments in software. Thus, the apparatus 100; the MS 106; the WPCN 110; the path distance module 114; the distances R1, R2; the base stations BS1, BS2; the position of the MS (X,Y); the grid X and Y; the triangulation module 118; the transmitter 120; the configuration module 119; the PAI frame decoder 122; the frames 123, 124; the PAI fields 310; the value of transmit power 314; the BS height 318; the positions (X1,Y1), (X2, Y2), 322; the additional path loss parameter values 326; the path loss logic 126; the received signal strength logic 130; the receiver 134; the system 180; and the display 184 may all be characterized as "modules" herein.

The modules may include hardware circuitry, single or multi-processor circuits, memory circuits, software program modules and objects, firmware, and combinations thereof, as desired by the architect of the apparatus 100 and the system 180 and as appropriate for particular implementations of various embodiments.

The apparatus and systems described herein may be useful in applications other than triangulating a position of an MS on a grid using radial distances between the MS and two or more BSs, respectively, wherein the radial distances are derived using a received signal strength and path loss parameter values transmitted from the BSs. Thus, various embodiments of the invention are not to be so limited. The illustrations of the apparatus 100 and the system 180 are intended to provide a general understanding of the structure of various embodiments. They are not intended to serve as a complete description of all the elements and features of apparatus and systems that might make use of the structures described herein.

The novel apparatus and systems herein may be included in electronic circuitry used in high-speed computers, communication and signal processing circuitry, modems, single or multi-processor modules, single or multiple embedded processors, multi-core processors, data switches, and application-specific modules, including multilayer, multi-chip modules. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., MP3 (Motion Picture Experts Group, Audio Layer 3) players), vehicles, medical devices (e.g., heart monitor, blood pressure monitor, etc.), set top boxes, and others. Some embodiments may include a number of methods.

Figure 4:
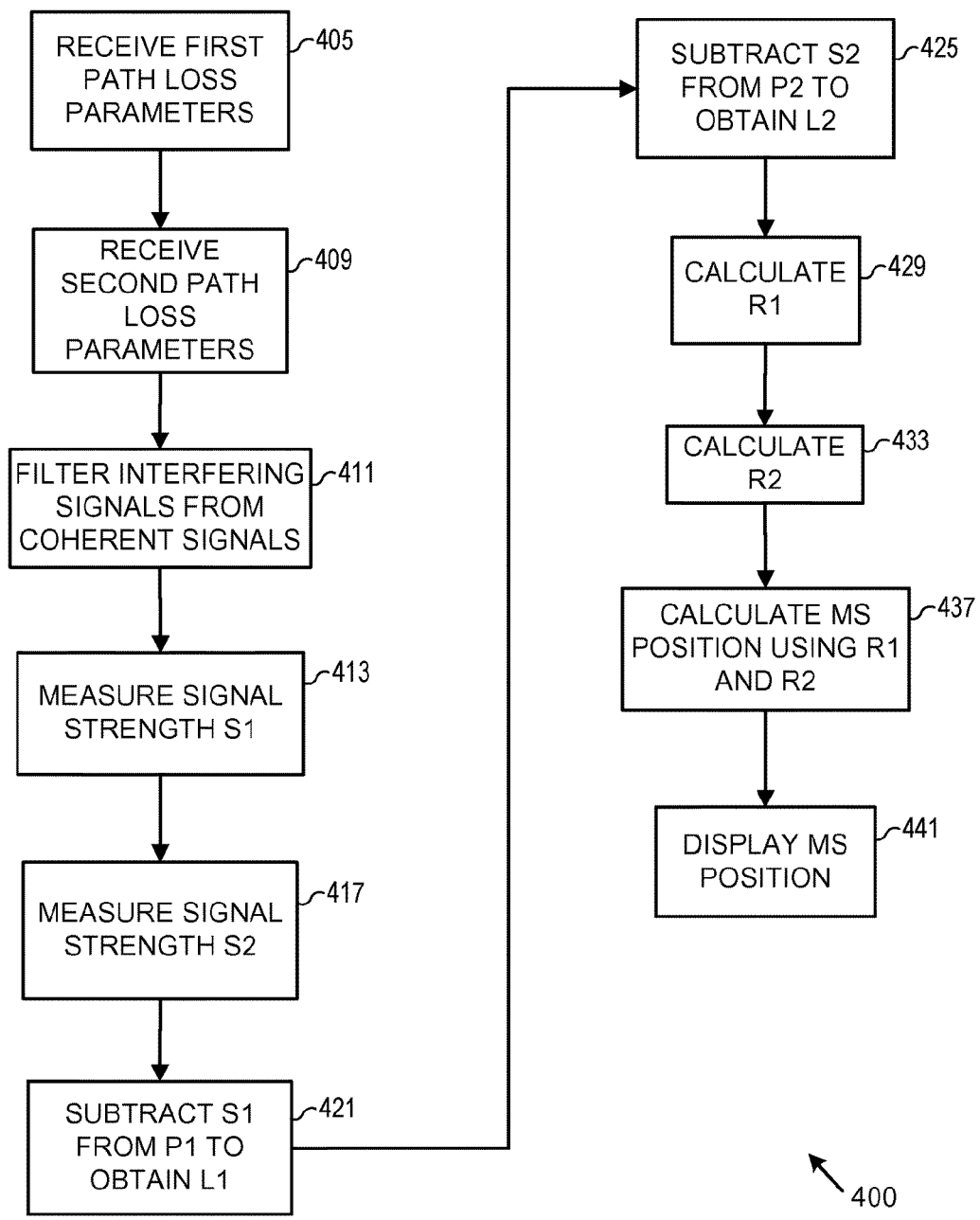
FIG. 4 is a flow diagram illustrating several methods according to various embodiments.

FIG. 4 is a flow diagram illustrating several methods according to various embodiments. A method 400 may be performed at an MS in one or more WPCNs using parameters transmitted by two or more BSs. In some embodiments, the BSs may operate according to different wireless networking standards. For example, a first base station (BS1) may operate according to a cellular networking protocol, and a second base station (BS2) may operate according to an Institute of Electrical and Electronic Engineers (IEEE) 802.16e protocol. Additional information regarding the IEEE 802.16e™ protocol standard may be found in 802.16e™: IEEE Standard for Local and Metropolitan Area Networks—Part 16: Air Interface for Fixed and Mobile Broadband Wireless Access Systems—Amendment 2: Physical and Medium Access Control Layers for Combined Fixed and Mobile Operation in Licensed Bands (published Feb. 28, 2006).

The MS may triangulate its position on a grid using radial distances between the MS and two or more BSs, respectively. Each radial distance may be derived using path loss parameter values transmitted from the respective BS and a received signal strength. In an embodiment, a COST231-Hata path loss model may be used to relate path loss to transmitted carrier frequency, antenna heights of the BS and the MS, metropolitan area size, and a distance between the MS and the BS. Some embodiments may utilize other path loss models.

The MS may calculate a first distance (R1) between the MS and a first base station (BS1) using a first path loss value (L1). L1 may comprise a value of a reduction in signal strength of a signal as transmitted by the BS1 and as received by the MS. The MS may also calculate a second distance (R2) between the MS and a second base station (BS2) using a second path loss value (L2). L2 may comprise a value of a reduction in signal strength of a signal as transmitted by the BS2 and as received by the MS.

The MS may subsequently triangulate its position relative to the grid using R1 and R2. The triangulation operation may utilize the geometrical relationships $R1^2=(X-X_1)^2+(Y-Y_1)^2$ and $R2^2=(X-X_2)^2+(Y-Y_2)^2$. The MS may solve these equations for X and Y, wherein X and Y comprise coordinates of the MS on the grid, $X_1$ and $Y_1$ comprise coordinates of the BS1 on the grid, and $X_2$ and $Y_2$ comprise coordinates of the BS2 on the grid.

The method 400 may commence at block 405 with receiving first path loss parameter values at the MS from the BS1. The first path loss parameter values may comprise one or more of a value of transmit power (P1) at the BS1, an antenna height (H1) associated with the BS1, and a position (X1,Y1) of the BS1 relative to the grid. The method 400 may continue at block 409 with receiving second path loss parameter values at the MS from the BS2. The second path loss parameter values may comprise one or more of a value of transmit power (P2) at the BS2, an antenna height (H2) associated with the BS2, and a position (X2, Y2) of the BS2 relative to the grid.

The method 400 may include filtering interfering signals from a signal received at the MS from the BS1 and from a signal received at the MS from the BS2, at block 411 ("coherent signals"). The method 400 may also include measuring a first signal strength (S1) of the signal received at the MS from the BS1, at block 413. The method 400 may further include measuring a second signal strength (S2) of the signal received at the MS from the BS2, at block 417. S1 and S2 may comprise averages of measurements taken over selected time periods.

L1 may comprise a function of the first path loss parameter values and S1. L2 may comprise a function of the second path loss parameter values and S2. The method 400 may further include subtracting S1 from P1 to obtain L1, at block 421. The method 400 may also include subtracting S2 from P2 to obtain L2, at block 425.

The method 400 may continue at block 429 with calculating R1 as ten to the power of $(L1-(46.3+33.9 \log(f_{c1})-13.82 \log(h_{b1}))-E1+G1)/(44.9-6.55 \log(h_{b1}))$. The method 400 may also include calculating R2 as ten to the power of $(L2-(46.3+33.9 \log(f_{c2})-13.82 \log(h_{b2}))-E2+G2)/(44.9-6.55 \log(h_{b2}))$, at block 433. E1 and E2 may be approximately equal to $3.2(\log(11.75h_m))^2 - 4.97$. G1 and G2 may be approximately equal to zero dBm for medium cities and suburban areas and three dBm for large cities. The quantity $f_{c1}$ may be approximately equal to a carrier frequency associated with the BS1. The quantity $f_{c2}$ may be approximately equal to a carrier frequency associated with the BS2. The quantity $h_{b1}$ may comprise an approximate height of an antenna associated with the BS1 above a ground level. The quantity $h_{b2}$ may comprise an approximate height of an antenna associated with the BS2 above the ground level. The quantity $h_m$ may comprise an approximate height of an antenna associated with the MS above the ground level. In some embodiments, $h_m$ may be statically configured by entering a value for $h_m$ at the MS. Some embodiments may measure $h_m$ using a laser beam, a barometric sensor, or other height-measuring device.

The method 400 may also include substituting values obtained for R1 and R2 into the geometrical relationships $R1^2 = (X-X_1)^2 + (Y-Y_1)^2$ and $R2^2 = (X-X_2)^2 + (Y-Y_2)^2$ to obtain the position of the MS (X,Y) relative to the grid, at block 437. The method 400 may conclude at block 441 with displaying the position of the MS (X,Y) on a display at the MS, perhaps overlayed onto a grid map. Some embodiments may use (X,Y) in an operation at the MS, or may transmit (X,Y) to another network entity. The other network entity may display (X,Y) on a grid map, use (X,Y) in an operation, or forward (X,Y) to a third network entity.

It may be possible to execute the activities described herein in an order other than the order described. Various activities described with respect to the methods identified herein may be executed in repetitive, serial, or parallel fashion, or a combination thereof.

A software program may be launched from a computer-readable medium (CRM) in a computer-based system to execute functions defined in the software program. Various programming languages may be employed to create software programs designed to implement and perform the methods disclosed herein. The programs may be structured in an object-oriented format using an object-oriented language such as Java or C++. Alternatively, the programs may be structured in a procedure-oriented format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment. Thus, other embodiments may be realized, as discussed regarding FIG. 5 below.

Figure 5:
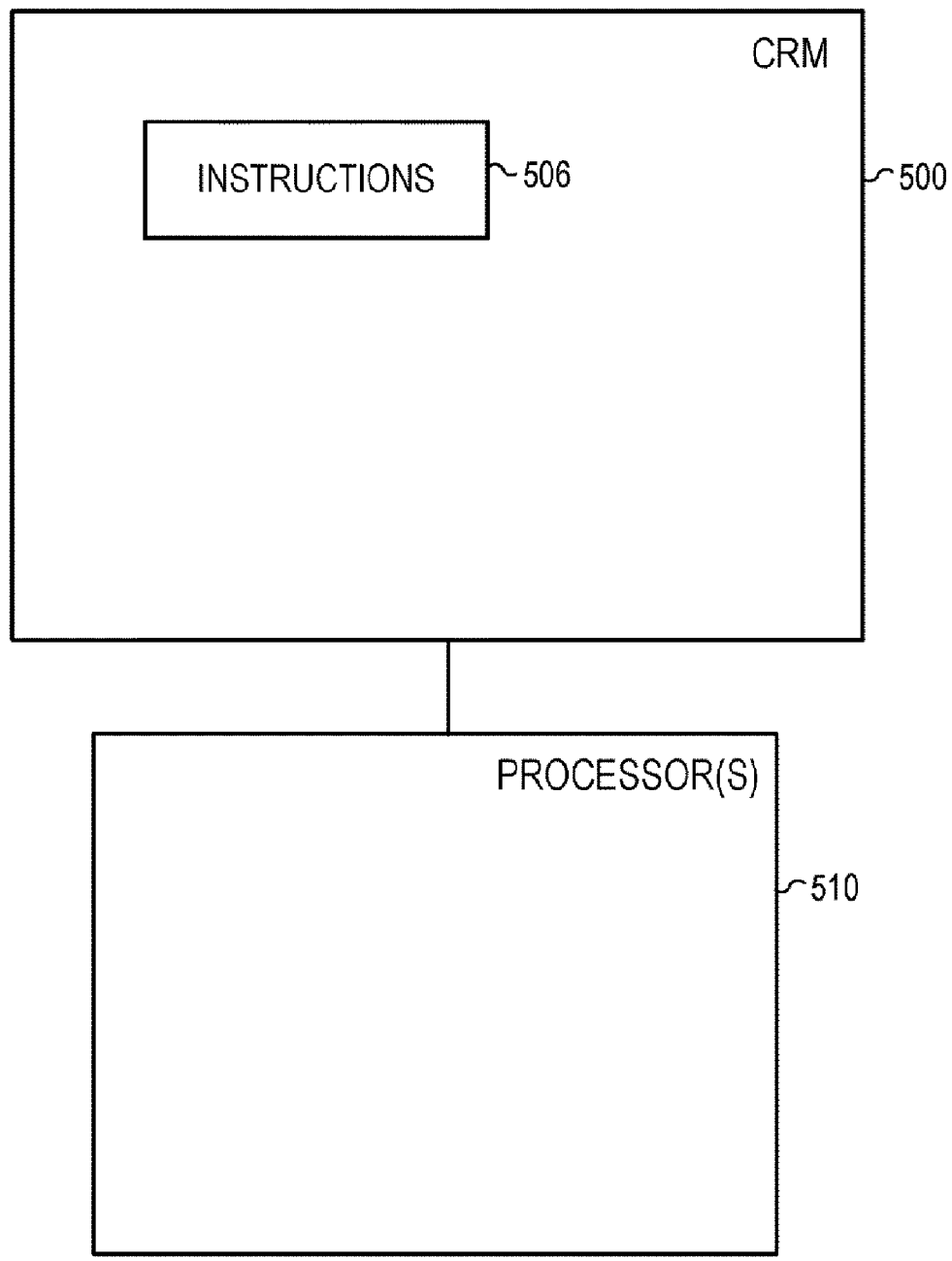
FIG. 5 is a block diagram of a computer-readable medium according to various embodiments.

FIG. 5 is a block diagram of a computer-readable medium (CRM) 500 according to various embodiments. Examples of such embodiments may comprise a memory system, a magnetic or optical disk, or some other storage device. The CRM 500 may contain instructions 506 which, when accessed, result in one or more processors 510 performing any of the activities previously described, including those discussed with respect to the method 400 noted above.

Apparatus, systems, and methods herein may triangulate a position of an MS on a grid using radial distances between the MS and two or more BSs, respectively. The radial distances may be derived using a received signal strength and path loss parameter values transmitted from the BSs, without requiring macro diversity or active transmission by the MS.

Although the inventive concept may include embodiments described in the exemplary context of an Institute of Electrical and Electronic Engineers (IEEE) standard 802.xx implementation (e.g., 802.11, 802.11a, 802.11b, 802.11e, 802.11g, 802.16, 802.16e™, etc.), the claims are not so limited. Additional information regarding the IEEE 802.11 standard may be found in ANSI/IEEE Std. 802.11, Information technology—Telecommunications and information exchange between systems—Local and metropolitan area networks—Specific requirements—Part 11: Wireless LAN Medium Access Control (MAC) and Physical Layer (PHY) Specifications (published 1999; reaffirmed June 2003). Additional information regarding the IEEE 802.11a protocol standard may be found in IEEE Std 802.11a, Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications—High-speed Physical Layer in the 5 GHz Band (published 1999; reaffirmed Jun. 12, 2003). Additional information regarding the IEEE 802.11b protocol standard may be found in IEEE Std 802.11b, Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band (approved Sep. 16, 1999; reaffirmed Jun. 12, 2003). Additional information regarding the IEEE 802.11e standard may be found in IEEE 802.11e Standard for Information technology—Telecommunications and information exchange between systems—Local and metropolitan area networks—Specific requirements Part 11: Wireless LAN Medium Access Control (MAC) and Physical Layer (PHY) specifications: Amendment 8: Medium Access Control (MAC) Quality of Service Enhancements (published 2005). Additional information regarding the IEEE 802.11g protocol standard may be found in IEEE Std 802.11g™, IEEE Std 802.11g™, IEEE Standard for Information technology—Telecommunications and information exchange between systems—Local and metropolitan area networks—Specific requirements Part 11: Wireless LAN Medium Access Control (MAC) and Physical Layer (PHY) specifications Amendment 4: Further Higher Data Rate Extension in the 2.4 GHz Band (approved Jun. 12, 2003). Additional information regarding the IEEE 802.16 protocol standard may be found in IEEE Standard for Local and Metropolitan Area Networks—Part 16: Air Interface for Fixed Broadband Wireless Access Systems (published Oct. 1, 2004).

Embodiments of the present invention may be implemented as part of a wired or wireless system. Examples may also include embodiments comprising multi-carrier wireless communication channels (e.g., orthogonal frequency division multiplexing (OFDM), discrete multitone (DMT), etc.) such as may be used within a wireless personal area network (WPAN), a wireless local area network (WLAN), a wireless metropolitan area network (WMAN), a wireless wide area network (WWAN), a cellular network, a third generation (3G) network, a fourth generation (4G) network, a universal mobile telephone system (UMTS), and like communication systems, without limitation.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom; therefore structural and logical substitutions and changes may be made without departing from the scope of this disclosure. This Detailed Description is therefore not to be taken in a limiting sense, and the scope of various embodiments is defined only by the appended claims along with the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the embodiments describe above and other embodiments not specifically described herein will be apparent to those of skill in the art upon reviewing the above description.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. Various features may be grouped together in the foregoing Detailed Description in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. A method performed by a mobile station (MS) operating in a wireless network, the method comprising:
   measuring a first signal strength received at the MS from a first base station (BS1);
   measuring a second signal strength received at the MS from a second base station (BS2);
   receiving first path loss parameter values at the MS broadcast from the BS1, wherein the first path loss parameter values include each of: a value of transmit power at the BS1, an antenna height associated with the BS1, and a position of the BS1;
   receiving second path loss parameter values at the MS broadcast from the BS2, wherein the second path loss parameter values include each of: a value of transmit power at the BS2, an antenna height associated with the BS2, and a position of the BS2; and
   calculating a three-dimensional location of the MS using the measured first signal strength, the measured second signal strength, the received first path loss parameter values, and the received second path loss parameter values;
   wherein the position of the BS1 includes grid coordinates corresponding to location of the BS1 relative to a two-dimensional grid, and wherein the position of the BS2 includes grid coordinates corresponding to a location of the BS2 relative to the two-dimensional grid; and
   wherein the first path loss parameter values and the second path loss parameter values are broadcasted from the BS1 and the BS2 respectively using a position assistant information (PAI) field of a broadcast frame.

2. The method of claim 1, further comprising:
   transmitting the calculated location of the MS to another network entity.

3. The method of claim 1, further comprising:
   using the calculated location in an operation at the MS.

4. The method of claim 1, wherein the first path loss parameter values are in a message broadcast from the BS1 and the second path loss parameter values are in a message broadcast from the BS2.

5. The method of claim 2 wherein the mobile station and the base stations operate in accordance with an IEEE 802.16 standard.

6. A method performed by a base station (BS) operating in a wireless network, the method comprising:
   determining path loss parameter values, wherein the path loss parameter values include a value of transmit power at the BS, an antenna height associated with the BS, and a position of the BS; and
   broadcasting, on a periodic basis within an information field of a broadcast frame, a message containing the path loss parameter values;
   wherein the position of the BS includes grid coordinates corresponding to a location of the BS relative to a two-dimensional grid; and
   wherein the BS operates in accordance with an IEEE 802.16 standard, and wherein the information field is a position assistant information (PAI) field.

7. A method performed by a base station (BS) operating in a wireless network, the method comprising:
   determining path loss parameter values, wherein the path loss parameter values include a value of transmit power at the BS, an antenna height associated with the BS, and a position of the BS; and
   broadcasting a message containing the path loss parameter values on a periodic basis;
   wherein the position of the BS includes grid coordinates corresponding to a location of the BS relative to a grid;
   wherein the BS operates in accordance with an IEEE 802.16 standard, and
   wherein the message is broadcasted in a position assistant information (PAI) field of a broadcast frame.

* * * * *